Feb. 22, 1966   J. DOERING   3,236,017
INTERCONNECTING STRUCTURAL UNITS
Filed Oct. 7, 1963
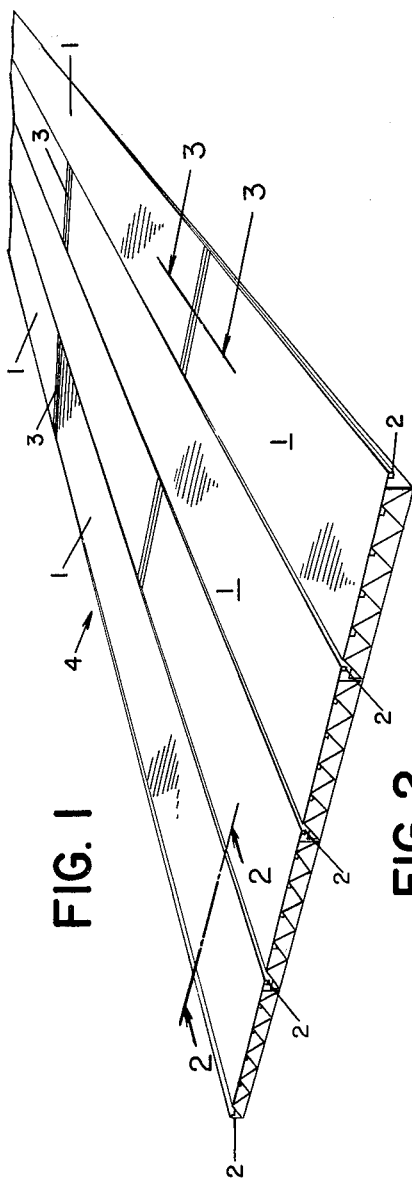
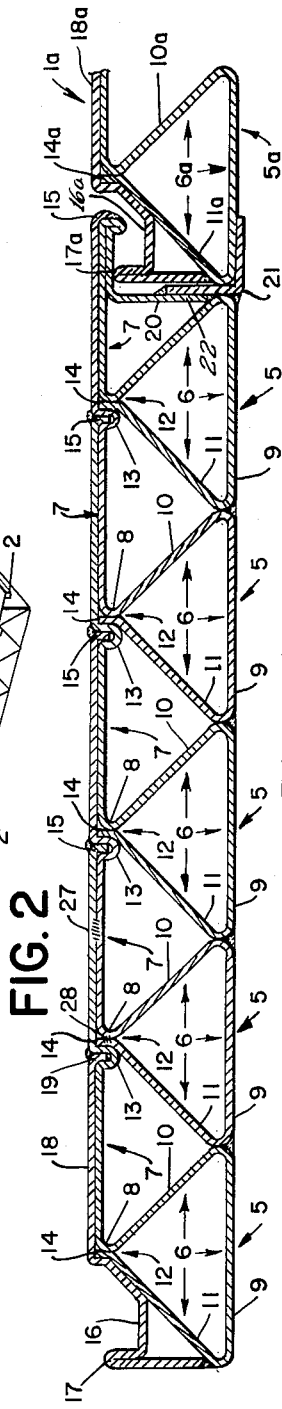
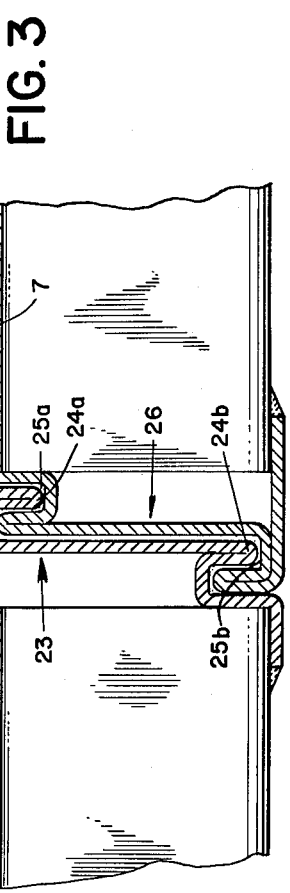
INVENTOR.
JOHN DOERING

United States Patent Office 3,236,017
Patented Feb. 22, 1966

3,236,017
INTERCONNECTING STRUCTURAL UNITS
John Doering, 112 Little Neck Road, Centerport,
Long Island, N.Y.
Filed Oct. 7, 1963, Ser. No. 314,163
9 Claims. (Cl. 52—579)

This invention relates to structural units adapted to be detachably interconnected with similarly constructed units and, more particularly, this invention relates to lightweight, rigid and inexpensively fabricated structural units for assembly at a selected temporary site to form a load-carrying deck or surface suitable for use as an aircraft landing field, a road, a building foundation or the like.

Structural units designed for assembly as temporary decks or surfaces for military, industrial or other uses are required to be lightweight, inexpensive to manufacture and capable of supporting heavy static and dynamic loads. Convenional decks or surfaces heretofore used as military aircraft landing strips, missile launching pads, building foundations, storage platforms and the like have included interconnected structural units which are fabricated from extruded sections. The extrusion method of forming metal sructural sections is more costly than other conventional metal working methods and, therefore, structural units produced in this manner are relatively expensive. While most assemblies of structural units provide adequate strength and durability for their intended uses, many units heretofore used were also expensive to fabricate due to the complexity in their design. The present invention overcomes these difficulties by providing an uncomplicated structural unit designed to be fabricated from roll-formed sheet metal using conventional metal bending equipment.

The usual procedure for laying a temporary surface includes the steps of clearing an area of trees, bushes and other obstacles and leveling the ground area using earth moving equipment as required. The units may be assembled on any selected surface which is disposed substantially in a plane. Structural units are laid out, arranged and then interconnected to form the assembly. Since ground surfaces prepared in the above manner will have uneven areas, the means for connecting the units are required to be designed to be movable relative to one another so that each unit of assembly is properly seated on and firmly supported by the ground surface without excessive stress being built-up in the units or their connecting means. The unit connecting means must allow for expansion and relative movement among the units caused by changes in loading and temperature and, of course, the deck or operating surface must be substantially level to accommodate high speed aircraft and vehicles. After use of the assembly at the temporary site is completed, the units are disassembled and transported to a new site for reassembly or are stored for future use.

It is a feature of this invention to provide a structural unit having a novel internal structural arrangement which is strong, lightweight and capable of fabrication from roll-formed sheet metal of substantially uniform thickness. The invention provides a structural unit fabricated entirely of inexpensively formed structural elements which are easily assembled and welded to form a lightweight and rigid structural unit. The units and their joints are made of roll-formed sheet metal of any selected standard thickness. Roll-formed metal sheets are standard steel mill products which are readily available and are relatively inexpensive. All elements and members of the units including the joints may be fabricated from sheets of the same thickness; however, if desired the joints can be made from heavier gauge metal to provide greater strength.

The structural elements which comprise each unit in accordance with my invention are shaped, assembled and welded together in such a manner that the completed units are capable of withstanding loads including the heavy impact of landing aircraft operated in accordance with military flight procedures. The elements are formed from metal sheets of suitable dimensions by bending the sheets using conventional means into the desired configurations. These elements are assembled and joined together, preferably by welding, to form the structural unit. Each unit includes a plurality of different shaped elements and members each having a configuration which contributes to the rigidity and strength of the assembled unit and, in addition, is inexpensively fabricated. Longitudinal connecting means are positioned along each side of the unit and end joints are fitted over the ends of the structural units to permit detachable assembly of the units. Fabrication of the structural units, including securing the connecting means to each unit, is preferably completed at an established place of manufacture. The units are constructed in sizes which are readily handled without the aid of machines and all units fabricated for use at the same site are made the same size so that they are interchangeable and therefore more readily assembled.

It has been found that units approximately one to two feet wide by ten to twelve feet long and several inches thick are readily handled to facilitate assembly and have adequate strength and rigidity. The completed units are then transported to the temporary site where they may be readily interconnected to form a load-carrying deck or surface of any desired dimensions.

The invention contemplates improvements in the structural design of units for assembly as temporary operating surfaces which units are capable of being inexpensively fabricated from a plurality of component structural members. Each of the component members includes a triangular-shaped tubular element and a laterally extending deck element extending in a substantially horizontal plane from the apex of said triangular base. Generally stated, the invention comprises a lightweight structural unit having a supporting base surface and a load-carrying deck surface made up of a plurality of similar component members. Each member is formed of an elongated metal sheet of essentially uniform thickness one side portion of which is bent longitudinally into a tubular element of substantially triangular cross section and the other side portion of which extends laterally as a deck element from the apex of said triangular tubular element substantially parallel to the base thereof a distance approximately equal to twice the width of said base. A plurality of these component members are joined side-by-side with the bases of the triangular tubular elements substantially abutting and secured together and with the laterally extending deck elements dispersed in overlapping relation and secured together. The bases of the tubular elements form the supporting base surface of the structural unit of single metal thickness and the overlapping deck elements form a load-carrying deck surface of double metal thickness.

Preferred embodiments of the invention are described below with reference to the accompanying drawings, wherein, FIG. 1 is a perspective view of a plurality of assembled structural units forming a deck operating surface in accordance with the invention;

FIG. 2 is a partial sectional view taken along line 2—2 of FIG. 1 illustrating the novel construction of adjacent structural units including the longitudinal connecting means;

FIG. 3 is an enlarged partial sectional view taken along line 3—3 of FIG. 1, illustrating the end connecting means of the structural units.

Referring to FIG. 1, there is shown a plurality of structural units 1 assembled and interconnected by longitudinal connecting means 2 and end connecting joints 3 to form a load-carrying deck or operating surface 4.

Referring now to FIG. 2 there is shown a sectional view of a structural unit 1 including five component members 5. Each component member 5 has two sections; a triangular-shaped tubular element 6 and a laterally extending deck element 7. The component member is formed from an elongated rectangular roll-formed metal sheet. One side portion including approximately three-fifths of the sheet is bent into a triangular-shaped tubular form, which may be sealed at its apex by a longitudinal seam weld, and the remaining side portion extending from the apex of the triangular tubular element forms the laterally extending deck element. The apex includes the bend 8 which forms the start of the lateral deck element. Each triangular-shaped tubular element 6 is in turn made up of a base surface 9 positioned substantially in a horizontal plane for engagement with the ground or other selected surface (not shown). Since each component member 5 and its sections are similar in construction, the same numeral designations on the drawings will be used to identify corresponding parts of the members. The base surfaces 9 of the tubular elements 6 are positioned side-by-side and are welded together. The remaining two sections of the triangular tubular elements 6 are supporting rib sections 10 and 11 which engage one another at an apex 12.

Deck element 7 has formed substantially in its center a U-shaped channel 13 such that the channel and the apex bend 8 of the adjacent component member engage one another to prevent lateral movement of the free edge 14 of supporting rib section 11. There is formed in the end of each deck element 7 a depending hook 15 which is received by the interior of the U-shaped channel of the deck element of a neighboring component member.

It should be noted that the construction of the unit 1 may include a series of any number of component members nested together side-by-side in a manner similar to the five members shown in the figures. The deck elements overlap to give a double thickness of sheet material for added strength and rigidity. Hooks 15 and flange 19 are preferably welded in their respective U-shaped channels to give rigidity to the unit. The component members may be attached to one another by using a longitudinal seam weld for securing the deck elements together as illustrated in FIG. 2 by longitudinal seam weld 27. Seam welds may also be used to secure bends 8 to free edges 14 for sealing the triangular tubular form as illustrated by apex seam weld 28 in FIG. 2. Seam welds may be used to give the units added strength or may be used in lieu of other welds depending on the requirements of the particular deck or surface.

The longitudinal means 2 for interconnecting the fabricated units together to form the load-carrying surface 4 includes a longitudinal male connecting element 16 having an upstanding male connector 17. A deck plate 18 which includes a depending flange 19 to provide a continuous uninterrupted operating deck surface 4 of the unit 1 is integrally formed with the male element as a single section of sheet metal, the single section being positioned on the first component member of the unit. As shown in FIG. 2, the deck plate 18 and male connecting element 16 are preferably formed from a single section of sheet metal; however, the deck plate and the male element may be fabricated from separate metal sheets and then welded together.

Along the side of the fifth and last component member is a C-shaped female connecting element 20. The female element 20 is formed by bending its deck element 7 into the desired shape. An L-shaped extension 21 is attached to the end of element 7 to complete the C-shaped element 20 and is also secured to the base surface. C-shaped element 20 receives and supports the male connecting element 16a of a similarly constructed unit shown in FIG. 2 as unit 1a. The C-shaped female element 20 has a depending projection 22 which is positioned vertically such that the upstanding male connector 17a limits the lateral movement of the second structural unit relative to the first through its engagement with depending projection 22. It should be noted that an alternate construction of the C-shaped element 20 is to shorten the deck element 7 to prevent interference of the adjacent unit 1a and then attach a separate C-shaped element to the underside of the shortened deck element. It will be noted that corresponding elements on similarly constructed unit 1a are shown with the suffix a.

Directing attention now to FIG. 3 it is seen that the unit end joints 3 include male and female connecting means, each of which is welded to the deck and base surfaces of the units to be connected. The male end connector 23 has two depending elements 24a and 24b which are received by cavities 25a and 25b of female end connector 26. The longitudinal and end connecting means are preferably made of roll-formed sheet similar to that used for the members and elements of the units themselves. Heavier gauge sheets may be used for the connecting means where added strength is required.

It should be noted that the units are preferably assembled in staggered fashion as shown in FIG. 1 so that the end joints of adjoining units are not aligned thus giving the assembled deck or surface greater strength. Units of shortened length may be used to give the surface a finished rectangular shape.

I claim:

1. A lightweight structural unit having a supporting base surface and a load-carrying deck surface made up of a plurality of similar component members each of which is formed of an elongated metal sheet of essentially uniform thickness one side portion of which is bent longitudinally into a tubular element of substantially triangular cross section and the other side portion of which extends laterally as a deck element from the apex of said triangular tubular element substantially parallel to the base thereof a distance approximately equal to twice the width of said base, a plurality of said component members joined side-by-side with the bases of the triangular tubular elements substantially abutting and secured together and with the laterally extending deck elements dispersed in overlapping relation and securing means integrally formed in each of said deck elements for preventing relative movement therebetween, the bases of said tubular elements forming the supporting base surface of said structural unit of single metal thickness and the overlapping deck elements forming the deck surface thereof of double metal thickness.

2. The structural unit in accordance with claim 1 in which a male connecting element is secured to the supporting rib section of the triangular tubular element forming one longitudinal side of said unit and in which a female connecting element is formed from an extended lateral deck element of the component member forming the other longitudinal side of said unit.

3. A plurality of interconnected structural units each in accordance with claim 2 in which the male connecting elements include upstanding connectors secured to the lower portion of said male elements, in which the female connecting elements are C-shaped elements including a depending projection and in which said C-shaped female elements receive said male elements such that said connectors and said projections engage one another to prevent separation of said structural units.

4. A structural unit in accordance with claim 2 having in addition end joints fixed to each end of said unit, said joints consisting of a male end connector formed from a metal sheet having at least one depending element and a female end connector formed from a metal sheet having at least one cavity positioned to receive and hold said depending elements when said end joints are engaged.

5. A lightweight structural unit having a supporting base surface and a load-carrying deck surface made up of a plurality of similar component members each of which is formed of an elongated metal sheet of essentially uniform thickness one side portion of which is bent longitudinally into a tubular element of substantially triangular cross section and the other side portion of which extends laterally as a deck element from the apex of said triangular tubular element substantially parallel to the base thereof a distance approximately equal to twice the width of said base, a plurality of said component members joined side-by-side with the bases of the triangular tubular elements substantially abutting and secured together and with the laterally extending deck elements dispersed in overlapping relation and secured together, each of said laterally extending deck elements having a longitudinal U-shaped channel formed substantially in its middle such that the exterior of said channel adjoins the apex of the triangular tubular element positioned under said laterally extending deck element thereby preventing lateral movement of said apex and in which depending longitudinal hooks are formed in the end of said laterally extending deck elements, said hooks engaging the U-shaped longitudinal channels of neighboring deck elements, the bases of said tubular elements forming the supporting base surface of said structural unit of single metal thickness and the overlapping deck elements forming the deck surface thereof of double metal thickness.

6. A lightweight structural unit having a supporting base surface and a load-carrying deck surface made up of a plurality of similar component members each of which is formed of an elongated metal sheet of essentially uniform thickness one side portion of which is bent longitudinally into a tubular element of substantially triangular cross section and the other side portion of which extends laterally as a deck element from the apex of said triangular tubular element substantially parallel to the base thereof a distance approximately equal to twice the width of said base, each of said deck elements having a longitudinal U-shaped channel formed substantially in its middle and in which the free edge of each triangular tubular element is held in engagement between the exterior of the U-shaped channel of the adjacent deck element and the apex bend of its own component member whereby the said structural unit is capable of carrying a heavy compressive load, a plurality of said component members joined side-by-side with the bases of the triangular tubular elements substantially abutting and secured together and with the laterally extending deck elements dispersed in overlapping relation and secured together, the bases of said tubular elements forming the supporting base surface of said structural unit of single metal thickness and the overlapping deck elements forming the deck surface thereof of double metal thickness.

7. The structural unit in accordance with claim 5 in which a male connecting element is secured to the supporting rib section of the triangular tubular element forming one longitudinal side of said unit and in which a female connecting element is formed from an extended lateral deck element of the component member forming the other longitudinal side of said unit.

8. A plurality of interconnected structural units each in accordance with claim 7 in which the male connecting elements include upstanding connectors secured to the lower portion of said male elements in which the female connecting elements are C-shaped elements including a depending projection and in which said C-shaped female elements receive said male elements such that said connectors and said projections engage one another to prevent separation of said structural units.

9. A structural unit in accordance with claim 7 having in addition end joints fixed to each end of said unit, said joints consisting of a male end connector formed from a metal sheet having at least one depending element and a female end connector formed from a metal sheet having at least one cavity positioned to receive and hold said depending elements when said end joints are engaged.

References Cited by the Examiner
UNITED STATES PATENTS

| 2,026,278 | 12/1935 | Higley | 189—34 |
| 2,184,113 | 12/1939 | Calafati | 189—1 |
| 2,740,167 | 4/1956 | Rowley | 20—8 |

FRANK L. ABBOTT, *Primary Examiner.*

RICHARD W. COOKE, *Examiner.*